Dec. 14, 1937.     G. H. FRASER     2,102,312

COUPLING OR OTHER TRANSMISSION DEVICES

Original Filed May 12, 1932     3 Sheets-Sheet 1

INVENTOR

George Holt Fraser

Dec. 14, 1937. G. H. FRASER 2,102,312
COUPLING OR OTHER TRANSMISSION DEVICES
Original Filed May 12, 1932   3 Sheets-Sheet 3

INVENTOR.
George Holt Fraser

Patented Dec. 14, 1937

2,102,312

UNITED STATES PATENT OFFICE 2,102,312

COUPLING OR OTHER TRANSMISSION DEVICE

George Holt Fraser, Brooklyn, N. Y.

Application May 12, 1932, Serial No. 610,807
Renewed July 15, 1937

33 Claims. (Cl. 192—12)

This invention relates to couplings for transmitting rotary motion, and aims to provide certain improvements therein.

Heretofore torque responsive couplings have been used for terminating drive of a driven part at a predetermined overload, compensating couplings have been used to compensate for imperfect alignment or flexure of shafts, cushioning couplings have been used for cushioning shock, friction couplings have been used for frictionally limiting transmission, separable couplings have been used for intermittent transmission, and plain couplings have been used for positive continuous drive, between a driver, as a line shaft, a speed reducer, a motor or other primary source of power, and a driven shaft, and when the latter has been connected to an unbalanced load, a bucket elevator or a tumbler mill, a back-lock for the unbalanced load has been provided for locking the driven part against reverse revolution after cessation of drive.

My invention aims to provide an improved torque responsive coupling which will automatically drivingly disengage at a predetermined overload, and which will yield within predetermined limits to cushion shocks or compensate for intermediate load variations, and which will yieldably preserve the relation of the driving and driven parts in normal operation, and which will instantly and positively rotatively free them at an adjustable predeterminable overload, and maintain such freedom until they are relocked after correction of the cause of the overload; it also aims to provide such a coupling which can easily be manually or automatically un-coupled, and which will positively maintain either position without frictional or relocking danger, and it also aims to provide torque responsive brake means, preferably as an improved automatic back-lock and to combine a back-lock with a torque responsive coupling in such manner that engagement or release of the coupling will simultaneously automatically actuate the back-lock to instantly restrain the back-lock from engagement when starting the drive, and to instantly automatically engage the back-lock upon disengagement of drive.

To this end in carrying out the preferred form of my invention I preferably provide an improved oscillatory driver intermediate and concentric of the driving and driven parts, and adjustably yieldably connected to the driving part for transmitting its revolution and yielding with variations in the torque, and drivingly disengageably connected to the driven part for driving the driven part with the driver throughout its intermediate oscillation and drivingly disconnecting it from the driven part at a predetermined limit of such oscillation; and I preferably drivingly connect the driver and the driven part by an improved movable key, moved by the oscillation of the driver relatively to the driving member, but maintaining driving engagement between the driver and the driven part until the predetermined limit of such oscillation is reached, and thereupon moved by the driving member to rotatively free such parts, which key is preferably semi-cylindrical and oscillatorily mounted in a cylindrical keyway formed partly in the driver and partly in the driven part, one part of which keyway is engaged by one edge of the key and the other part by the other edge when the key is oscillated out of its inactive position, which key is operatively connected to the driving member for oscillating the key with oscillation of the latter, and is preferably carried by the driver at one side of the axis of the key and operated by the driving member at the other side of the axis of the key; and I preferably provide a circumferentially cushioning connection between the driver and the driven part for slightly yieldably or elastically cushioning their engagement and transmission of torque, and for facilitating oscillation of the key, preferably by forming the key of a segment of a hollow spring steel tube or cylinder so that it may be radially yieldable and its hollow may afford clearance for one edge of the reciprocal keyway in the part it co-operates with; and I preferably compensatingly connect the driver and the driving part to compensate for axial oscillation of these incident to shaft flexure or angularity, as by a ball and socket connection in the form of a segment of a sphere; and I preferably provide a mis-alignment connection between the driving part and the primary source of its drive; and I preferably provide improved yieldable elastic provisions for drivingly connecting the driving part and the driver, preferably as coil springs engaging these, one of which is adjustable to vary its tension, and as an adjustable screw adjusted compression spring for closely adjusting torque limitations; and I preferably provide torque controlled, restrained, actuated, or operated, brake means, for torque responsive resistance of rotation of the driven member relatively to the driver member, preferably as a non-rotary clutch drum on the bearing frame for the driven shaft, and a torque controlled, restrained, actuated, or operated, or responsive, pivoted backlock dog on the driven shaft in operative relation to the yieldable connection, preferably by being movably engaged with a projection on the key engaging a tail on this dog when the key is in the driving position for then restraining the dog against frictional contact with the drum, and disengaging the tail when the key moves to the release position, and for then automatically engaging the dog to resist reverse revolution of the driven part, and thus sustain the unbalanced load of an elevator or other device, and I provide various other features of improvement, all of which will be more fully hereinafter set forth with reference to the accompanying drawings, in which—

Fig. 8 being cut approximately on the plane of the line 8—8 in Fig. 7 and looking in the direction of the arrow; and Fig. 9 being cut approximately on the plane of the line 9—9 in Fig. 7 and looking in the direction of the arrow; and Fig. 10 being cut approximately on the plane of the line 10—10 in Fig. 7 and looking in the direction of the arrow; and Fig. 11 being cut approximately on the plane of the line 11—11 in Fig. 7 and looking in the direction of the arrow.

Referring to the drawings I will now describe the preferred adaptation of my present improvements, and the preferred form of my present invention, as shown in Figs. 1 to 17, in which, let A represent a motor, B its high speed shaft, C a speed reducer, D its driven shaft, E a mis-alignment compensator coupling fixed thereon, F a torque responsive clutch, O its driving member, J its driver member rotatable with the driving member O, said members the one movable relatively to the other, M a yieldable drive connection between said members, adapted to transmit a normal torque load, G a driven shaft, K movable clutch means in operative relation to the driver and driven members, L clutch operator means, rotatable with the driving member, said clutch means and said operator means the one movable relatively to the other, r an oscillation provision in operative relation to the clutch means and to the clutch operator, for operating the former by said relative movement upon overload of the connection M, H the frame or casing of an unbalanced load elevator, and I brake means or a back-lock for the driven shaft G.

These parts may be any usual or suitable construction for affording a primary source of power at high speed, reducing such speed, separably coupling the driven shaft of the reducer with the driving shaft of the elevator, and preventing back running of the latter.

Figure 1:
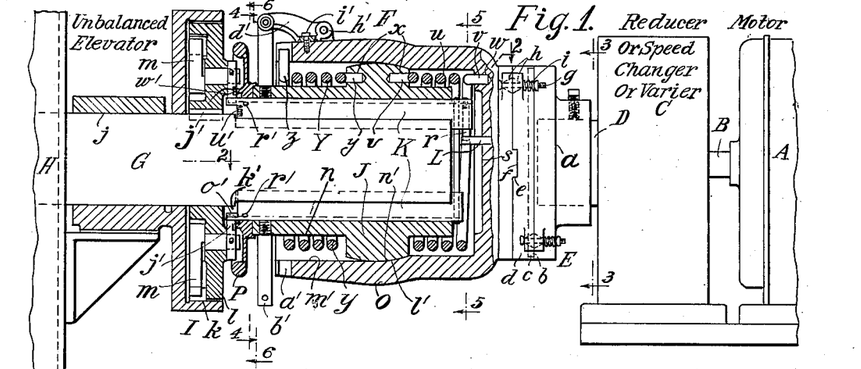
Fig. 1 is a fragmentary side elevation showing the preferred form of my improved combination of an elevator, a motor, a speed reducer, and my automatically torque disengaged compensating coupling mounted on the driven shaft of the speed reducer as a part thereof, and my automatically actuated and coupling restrained back-lock or one-way brake mounted on the driven shaft, and connected to the coupling, as a part thereof, and in operative relation to my oscillatory and lock restrainer key, the key and driven shaft being shown in elevation, the driver and driving member and releaser being shown partly in vertical axial section, cut approximately on the line 1—1 of Figs. 4, 5 and 6, and the reducer being shown in side elevation, and the elevator and motor being shown fragmentarily in side elevation.
Figure 2:
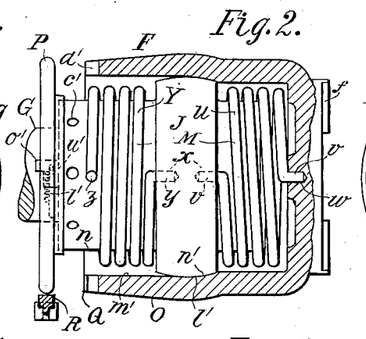
Fig. 2 is a fragmentary horizontal section of the driving member cut approximately on the line 2—2 in Fig. 1 and showing the driver and its torsional springs in plan, and the manual operator restrainer cut-out releaser, or clutch actuator, in plan.
Figure 3:
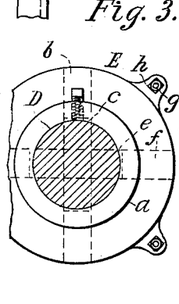
Fig. 3 is a cross section of the driven shaft of the reducer showing the alignment coupling fragmentarily in side elevation and cut approximately on the line 3—3 of Fig. 1.
Figure 4:
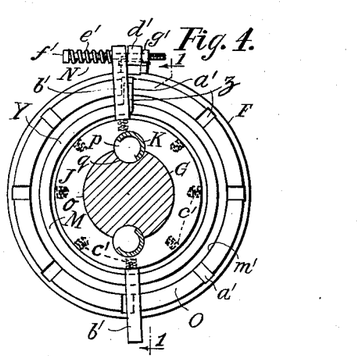
Fig. 4 is a cross section of the driven shaft of the coupling, showing the driver and the driving member in end elevation, and cut approximately on the line 4—4 in Fig. 1 and looking in the direction of the arrow.
Figure 5:
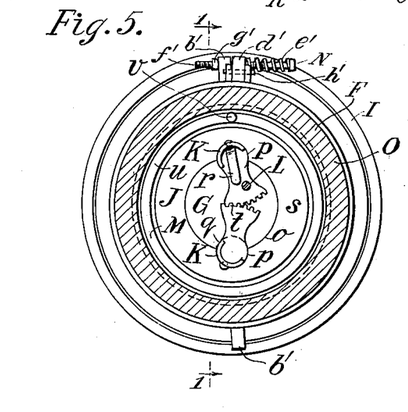
Fig. 5 is a vertical cross section of the driving member cut approximately on the line 5—5 in Fig. 1 and looking in the direction of the arrow, and showing the driver and its spring and keys in end elevation.
Figure 6:
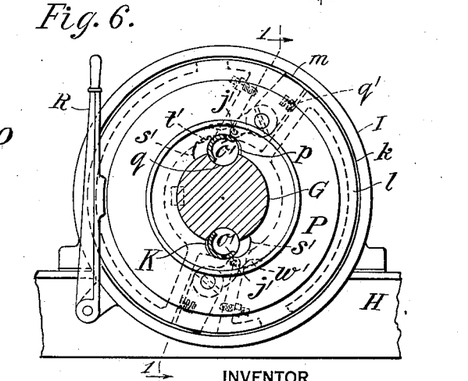
Fig. 6 is a vertical cross section of the driven shaft and its keys, cut approximately on the line 6—6 in Fig. 1, and looking in the direction of the arrow, and showing the clutch operator and the back-lock and its drum in elevation and the elevator casing fragmentarily in side elevation.
Figures 7, 12:
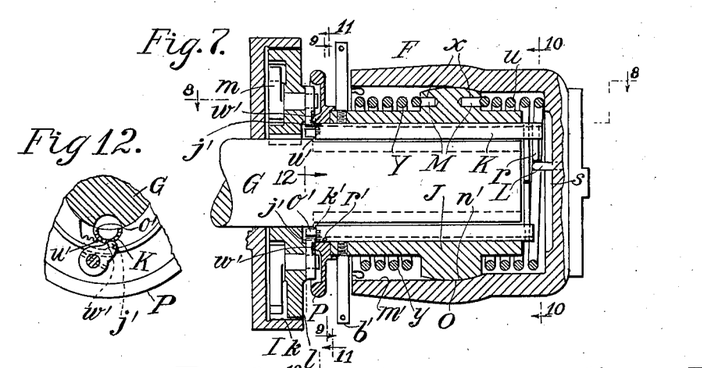
Figs. 7 to 11 inclusive are views similar to Figs. 1 to 6 inclusive, but showing the parts in a position in which the oscillatory key is drivingly disengaged and the back-lock is resistantly engaged, Fig. 7 being cut approximately on the plane of the line 7—7 in Fig. 10 and looking in the direction of the arrow.
Fig. 12 is a fragmentary vertical sectional view of the face of the manual operator P, showing an end elevation of the lower key K in its drive disengagement position, with its brake restrainer o' moved out of restraint engagement with the tail pin j' of the back-lock, and the tail pin j' in engagement with its actuator w' on the manual operator P, the view being cut on the plane of the line 12—12 in Fig. 7, and looking in the direction of the arrow.
Figure 8:
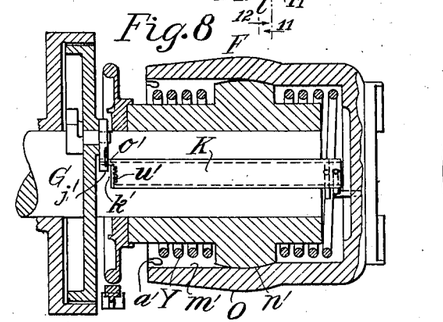
Figure 9:
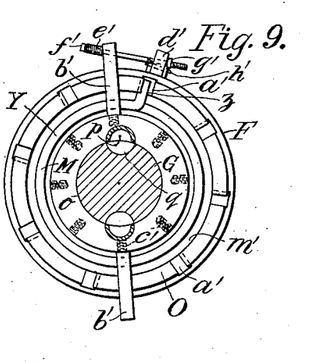
Figure 10:
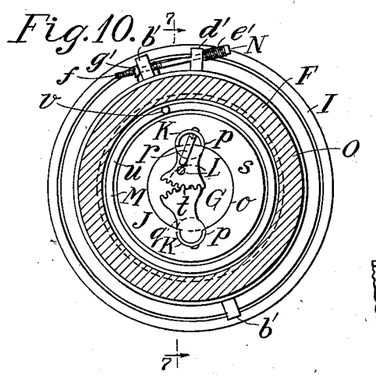
Figure 11:
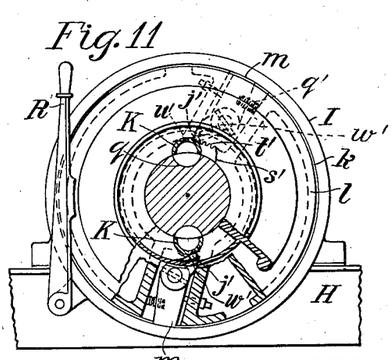
Figures 13, 14:
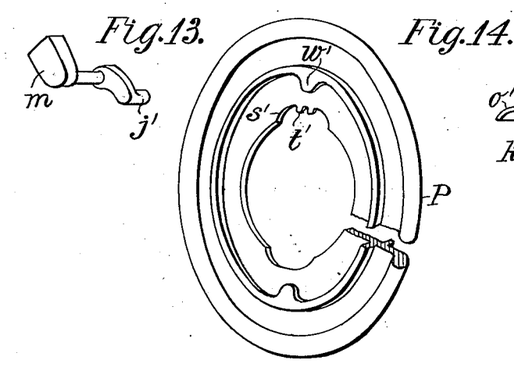
Fig. 13 is an enlarged perspective view of one of the back-lock dogs.
Fig. 14 is an enlarged perspective view of the manual operator P, partly broken away to show it in section.
Figure 15:
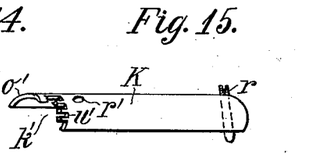
Fig. 15 is an enlarged perspective view of one of the keys K.
Figure 16:
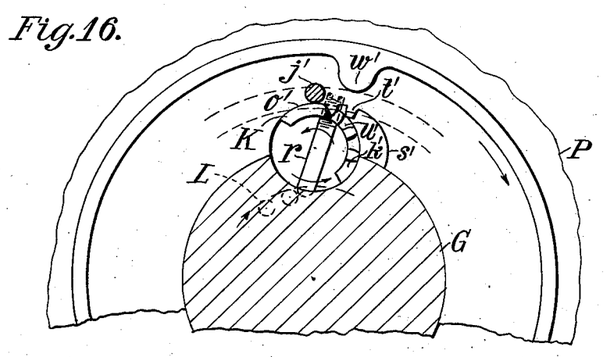
Fig. 16 is an enlarged diagrammatic fragmentary end elevation of the key K showing its associated parts in their drive engagement position, in which the tail j' of the back-lock rides on the brake restrainer tit o' of the key K and projects into the path of the actuator w' on the manual operator P, and in which the motion reversal torque oscillator provision r is adjustable into the path of approach of the operator L for circumferentially varying the space therebetween for circumferentially varying the lost motion operative relation therebetween.
Figure 17:
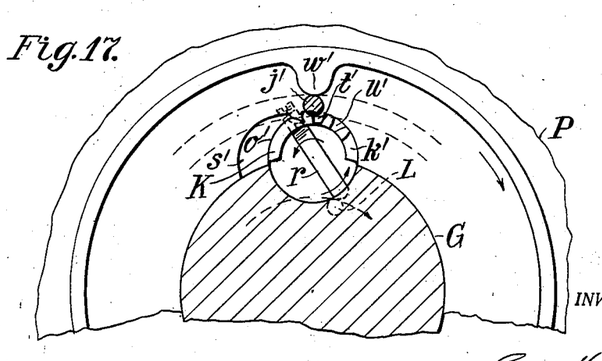
Fig. 17 is a similar view but showing the key K when oscillated to its disengagement position, in which its tit o' permits the tail j' of the back-lock to be pushed by the cam w' into the recess k' sufficiently to clear the dotted circular path between the cam w' and this position of the restrainer tit o', for applying the back-lock and permitting these to rotate relatively to the tail without molesting the back-lock while the clutch is disengaged, and showing how the round end of the oscillator r has been outwardly moved into its passive position by the outwardly active circular face of the operator L inwardly of it during rotation of the operator, so that continued rotation thereof will not molest the key K, for re-engagement of which the manual operator P must be moved circumferentially of it.

The coupling E may be any connection for rotating the driving member O from the driving shaft D, but is preferably a compensating coupling for compensating for variations in parallelism or alignment in the axes of these, and is preferably rigidly set on the driving shaft D and movably mounted on the driving member O, and preferably as shown consists of a collar $a$ having a diametrical rib $b$ fitting slidingly in a diametrical groove $c$ in one side of a floating washer $d$, the other side of which has a diametrical groove $e$ disposed at right angles to the groove $c$ and fitting slidingly over a diametrical rib $f$ on the end face of the driving member O, to which, and to the collar $a$, it is removably and yieldably connected by rocking bolts $g$ rockably mounted in lugs $h$, and axially pressed by springs $i$, for permitting slight relative radial and axial movement of the parts while transmitting revolution from one to another through the engagement of the ribs and grooves, as usual in such couplings.

The driving member O may be any rotative driving part of any transmission device, speed reducer or coupling, but I prefer to make it as a separate part detachably and preferably movably connected to its primary source of power, in the manner described for connecting it to the coupler E.

The driver member J may be any suitable member rotatable with and adapted to have movement with respect to the driving member O, and the connection M between them may be any suitable yieldable drive connection adapted to transmit a normal torque load.

The driven shaft G may be any shaft for operating any device, rotatably mounted in a bearing $j$ and having a projecting end for engagement by the coupling F.

The clutch means K may be any torque controlled movable means adapted to drivingly connect and disconnect the driver J and driven member G, and the clutch operator means L may be any suitable means rotatable with the driving member, and cooperable with the clutch means upon overload of the yieldable connection M, for operating the clutch means upon such overload, and the oscillation provision $r$ may be any suitable provision in operative relation to the clutch means K and the operator means L, and adapted to translate relative movement thereof into movement of the clutch means, for torque controlled drive.

The frame or casing H may be that of any device which is to be operated by the shaft G, such as a conveyor, or an unbalanced bucket elevator, or tumbler mill, and for an unbalanced device usually comprises a back stop drum or flange $k$ for resisting its unbalanced load when it is not driven.

The brake means I may be any suitable brake means or back stop means for resisting rotation of the driven member relatively to the driver member, such as a flange $l$ keyed to the shaft G and carrying ratchets or dogs $m$ within and for engaging the drum when the shaft G is arrested, for preventing reverse revolution from an unbalanced load. Springs $q'$ or gravity, are usually employed for operating the dogs $m$.

The driving member O is shown as disposed at one side of the periphery of the driver member J, and one is movable relatively to the other in the direction of torque upon yield of the connection M. The driven member G is shown as disposed at the other side of the driver member J, and the driver and driven members are shown as having adjacent reciprocal transmission faces or peripheries, having therein reciprocal keyway provisions. The clutch means K is shown as having a semi-cylindrical or transmission portion disposed about an axis in one of said provisions and as having another or flatter portion oscillatory into coincidence with said faces or peripheries for terminating transmission from the driver to the driven member, and oscillatory across the plane of said faces or peripheries and into the other of said keyway provisions, for transmitting said rotation.

According to one feature of my invention I dispose the driving member O at one side of the circle of the drivingly engageable transmission faces between the driver member J and the driven member G and dispose the operator L at the other side of said circle and in operative relation to the clutch member K at said other side, and operatively connect the driving member and the operator across said circle and across the driver member and across the axis on which the clutch member K oscillates, for rotating the operator L with the driving member O from one side of said axis while it is in operative relation to the clutch member K at the other side of said axis, and I preferably dispose the oscillator $r$ at said other side and in approachable spaced relation to the operator L, and in the path of rotation thereof, and intermediate said axis and the operator, and preferably make it movable in the direction of said rotation and swingable out of said path for operating the clutch member K upon overload of the connection M, and I preferably make the operator L and oscillator $r$, the one inactively movable relatively to the other during normal torque load, for then permitting transmission, as by disposing them in lost motion relation, and cooperably actively movable upon overload, for then controlling transmission, and I preferably dispose the oscillator provision $r$ and the operator L, at the same side of the axis about which the clutch member K oscillates, and in operative relation at said side.

When the transmission face of the driver J is a female face, as its internal periphery, and that of the driven member G is a male face, as its external periphery, the axis of the oscillatory key and its semi-cylindrical portion is preferably disposed in the driver member J, and its flatter side should coincide with the inner periphery thereof, as by being arc-shaped or concave, to terminate transmission, and should oscillate across said periphery and into a keyway provision in the driven member G, to effect transmission. In such case the cylindrical side of the key, for termination of transmission, should be moved in direction reverse to the direction of rotation of the operator L, to accomplish which according to one feature of my invention I preferably dispose the operator inwardly of said periphery and at the inner side of said axis, and the driving member O outwardly of said periphery and at the outer side of said axis, and operatively connect the operator and the driving member by a connection $s$ extended from one to the other side of said axis, and across and past the latter and said peripheries, preferably as shown by extending one end of the driving member O across the adjacent end of the driver member J and the clutch member K. In such case the torque actuated clutch mover or oscillator provision $r$ is at the inner side of the axis of the clutch and during transmission is disposed across the reciprocal faces or peripheries of the driver and driven members, and preferably consists of a pin extended across said peripheries and transversely across the path of rotation of the operator L, and is preferably swingable about the axis of the clutch member K, and in the direction of rotation of the operator L, which latter preferably acts circumferentially toward the oscillator to swing it out of the path of rotation of the operator upon overload of the yieldable connection.

When the oscillator r and the operator L are at the inner side of the axis of the clutch key K, and its semi-cylindrical portion is at the outer side of its axis, the oscillator affords a motion reversal provision between the semi-cylindrical portion of the clutch key K and the operator L, and moves the semi-cylindrical portion in direction reverse to the direction of rotation of the operator upon overload of the yieldable connection M, thus utilizing the direction of rotation for oscillating the semi-cylindrical portion of the clutch key K in the reverse direction, for torsional control of transmission.

According to another feature of my invention I preferably provide a torque responsive clutch with manually operable controller means, as P, preferably neutrally operable with the clutch throughout its torque responsive operation, and manually operable for manually controlling it during or relatively to its torque control, for accomplishing which I preferably provide a torque responsive clutch with a manual controller which is rotatable with it during transmission and which is passively movable with it during its torque responsive operation, and which is in manual operative relation to it, and manually movable relatively to a yieldable drive connection to which it is responsive, as M, for manually controlling transmission from a torque responsive clutch in addition to torque operation thereof.

According to another feature of my invention I preferably provide torque controlled drive means, as F, with torque responsive brake means, as I, for resisting rotation of a driven member, as G, relatively to a driver member, as J, when transmission from the latter is torque responsively terminated, as by operation of torque actuated clutch means, as K, by torque responsive operator means, as L, upon overload of a yieldable drive connection, as M. For accomplishing this I preferably provide torque responsive brake means, as I, in operative relation to a driven member, as G, and to a yieldable drive connection, as M, and controlled, restrained, operated, or actuated, by the latter, for inactively permitting rotation of the driven member during transmission, and for torque responsively actively resisting rotation of the driven member relatively to its driver member upon termination of transmission upon overload of the yieldable connection. Any suitable means may be employed for availing of any of these features of my invention, but I prefer to avail of them in combination and by the means shown in the drawings, which illustrate one example of my improvements as the preferred form thereof, in which form I preferably construct the driving member as a tubular or cup shaped hub, one end of which is carried by the shaft D, and the other end of which is open and encircles the end of the shaft G, which hub preferably has a cylindrical bore or socket $m'$, and to construct the driver J as a tubular member having an outer cylindrical periphery $n$ entered within and movably connected within this socket, so that the hub may oscillate circumferentially of the driver, and to construct the driver with a cylindrical bore $o$ for receiving and revolubly fitting the end of the driven shaft G, and to disengageably drivingly connect the shaft G and the driver by one or more movable keys K, which are preferably radially yieldable semi-cylindrical tubes, oscillatorily mounted in semi-cylindrical keyways $p$ in the driver and oscillating into and out of engagement with semi-cylindrical keyways $q$ in the shaft G, for drivingly locking or unlocking these parts, and to provide one of these keys with an oscillation provision at its side remote from its semi-cylindrical side, such for example as a finger or projection $r$ projected inwardly of its center and transversely across and into the path of an operator L carried by and rotated with the inner wall or flange portion $s$ of the hub, which portion is preferably extended inwardly radially across the outer and inner peripheries of the driver and past its adjacent end and the adjacent end of its key, to inwardly of the latter, and carries the operator L inwardly thereof, so that when the hub oscillates on the driver the operator L will strike the finger $r$ and oscillate the key K until its edges clear the periphery of the shaft G to then permit the driver J to rotate freely on the shaft G, and I prefer to normally resist sufficient oscillation of the hub to effect such unlocking by torsionally yieldably connecting the hub and the driver.

By this arrangement the parts will be locked to drive until the load overcomes the resistance of the torsional connection M sufficiently to cause the pin to rock the key out of engagement with the shaft G, whereupon drive of the latter will cease and free revolution of the other parts may continue without danger of relocking if the finger $r$ and pin L are so proportioned and located as not to again engage, which is preferable to avoid danger of relocking until cause of overload has been removed, which I preferably accomplish by making the finger $r$ so short that its end is moved out of the path of rotation of the pin L as the latter moves past it.

Preferably reverse keys K are provided and work in diametrically opposite key-ways for doubly locking the shaft and driver to resist chattering, and, when the keys are semi-tubular and slightly yieldable, to cushion in both directions the driving connection between the driver J and the shaft G, and in such case each key is preferably provided with a toothed segment or rack connection $t$ for simultaneously reversely operating them from each other.

Any suitable torsional connection between the hub and the driver J may be used, but I prefer to use one or more torsional springs coiled loosely around the driver and within the hub and connected to both for yieldingly transmitting torsion from the hub to the driver, and when two such springs are used the inner spring $u$ preferably has axially extended ends $v$ engaging a socket $w$ in the hub and a socket $x$ in the driver, and the outer spring Y preferably has an axially extended inner end $y$ engaging another socket $x$ in the driver and a radially extended outer end $z$ adjustably engaging one or another of a plurality of notches $a'$ in the hub, according to the torsional resistance desired for this spring, which is adjusted by rotating the driver J by one of its handles $b'$ and then screwing its other handle $b'$ into the corresponding peripheral hole $c'$ which will bring it in front of the hinge stop lever $d'$, further adjustment being effected preferably by an outer yieldable connection N, comprising a compression spring $e'$ carried by a bolt $f'$ and adjusted by a screw nut $g'$ screwing against the lever $d'$.

The sockets $w$ and $a'$ in the hub preferably correspond in number and location, so that the end of the inner end of the inner spring and the outer end of the outer spring may each be inserted in the desired socket, and then the driver may be oscillated until the springs give the desired torsional stress, whereupon the handle adjacent the arm $d'$ will be held by swinging this arm on its hinge $h'$ into the path of the adjacent handle and securing the arm by its screw $i'$, thus retaining the torsional stress of the springs, which may then be additionally adjusted by compressing the spring $e'$ against the adjacent handle $b'$ by screwing up the nut $g'$ against the arm $d'$ for delicate or finer adjustment. Two or more handles $b'$ are preferably used, and these are preferably removably screwed into the desired one of a plurality of screw threaded holes $c'$ in the driver J.

This construction affords a resilient as well as a yieldable clutch connection between the driving member and the driven shaft for cushioning minor variations in torsional strain, when such cushioning is desired. Any one or more of the springs may be used according to the torsional strain to be transmitted, and for light strain a spring $e'$ suffices.

One feature of my invention preferably provides for compensation of misalignment between the driving member and the driven shaft, and this I preferably accomplish in the construction shown by a compensating connection between the driving member and the driver, which is preferably accomplished by forming the hub with a female face $l'$ in the form of a segment of a sphere, and the driver with a male face $n'$, in the form of a segment of a sphere, rockingly fitting the female face for rockingly connecting the hub and driver, so that these may rock to compensate for any misalignment, the resiliency of the springs $u$ and Y permitting such relative movement, and the outer end of the spring Y should by hooking in the under cut notch $a'$ yieldably hold the driver axially within the cup.

My invention preferably provides torque responsive brake means or back-stop means for resisting rotation of the torque controlled driven member relatively to or reversely of the driver member upon termination of transmission, and preferably for automatically mechanically restraining the back lock dog $m$ during normal operation and automatically freeing it when drive is disconnected. This may be accomplished in any suitable manner for transmitting the torsional oscillation of the driving member to the dogs, but I prefer to accomplish it by providing each dog with a tail $j'$, and extending each oscillating key K adjacent this tail and providing it with a tit $o'$ projecting into the path of the tail when the key is in the driving position and then engaging and sustaining the tail to restrain the dog in its inactive position so long as the key is in the driving position, which tit is proportioned to move clear of the tail when the key is oscillated to its disengaged position and then permit the tail to drop into a recess $k'$ in the end of the key so that the dog may be instantly locked by gravity or centrifugal force, or the usual dog spring $q'$, the instant the drive is discontinued, and thus prevent back running of the unbalanced load.

For restoring the drive connection after the cause of overload has been corrected one of the keys is manually oscillated into its driving position in any suitable manner, for which purpose I preferably provide each key with a hole $r'$ in which a pin may be inserted for turning it, its motion when two keys are used being transmitted to the other key by the rack $t$, which turning throws the finger $r$ into the path of the operator L, which is restored to its inactive position by one or all the torsional springs as soon as drive is released. After the key is again locked the dog $m$ is unlocked by engagement of the tit $o'$ with the tail $j'$ which tit then restrains the dog from dragging during drive. When the key is oscillated to its unlocked position the tit moves sufficiently inwardly from the tail of the dog to prevent the tit from releasing the dog during continued rotation of the key with the driver.

The key is swiveled in the driver and held there by centrifugal force and by the fact that the edges of the keyway in the driver are slightly below the center of the key, because the center of the key is coincident with the periphery of the bore of the driver so that its edges afford a slight overhang for retaining the key in it. If solid, the inner face of the key is bored to correspond with the cylindrical bore of the driver, and when hollow as shown the edges of the key are similarly bored so that in its inactive position they clear and revolve against the periphery of the driven shaft G.

In operation the clutch or coupling F, and its parts assembled on the driven shaft G, is set on the driven shaft D of a reducer, by its hub $a$, and revolves therewith, and when a parallelism coupling E constitutes part of the driver as shown it compensates for lack of parallelism between the driver and the shaft on which it is set. The keys are disengaged and the torsional adjustment is made by turning the handles $b'$ and locking one of them with the arm $d'$, and then adjusting the screw $g'$. The keys are then oscillated into locking engagement, whereupon drive may be started by starting the motor and will continue until overload automatically discontinues it by oscillating the driving member on the driver until the keys are oscillated to the unlocked position, whereupon the driver and all driving parts connected to it may continue revolution without revolving the driven shaft G, back turning of which will be prevented by the dogs $m$ which have been released from restraint by oscillation of the keys.

It will be understood that my invention provides improvements which may be variously and advantageously availed of in whole or in part, and it will be understood that the invention is not limited to the particular details of construction, combination, or use, set forth as constituting its preferred form, since it may be employed in whole or in part according to such modifications or equivalents as circumstances or the judgment of those skilled in the art may dictate, without departing from the spirit of the invention.

When my coupling is used as a cut-off coupling or clutch, or for manual disengagement of the drive connection between the line shaft and the driven shaft, with or without my automatic, yielding, compensating features, the key or keys are preferably oscillated by a manual operator P, preferably a ring fitting over the end of the driver and having a notch $s'$ clearing its key and internal teeth $t'$ entering the slots $u'$ in the end of the key and engaging the teeth thereof to oscillate the key from its locked to its unlocked positions, the ends of the notch striking the key to arrest the operator when it has been oscillated to either position.

The wheel may be oscillated by hand when the driver is stationary or slowly revolving for then locking or unlocking the key, but during revolution I prefer to unlock it by frictionally engaging its periphery with a brake for retarding it as the foot or hand operated stop lever R, which will cause it to oscillate the key to the unlocked position and when the lever is released will permit it to revolve with the driver until the motor is stopped.

This automatic cut-off preferably also comprises an automatic dog operator for manually throwing the dog into back lock engagement as soon as the key is unlocked, which is especially desirable where springs or gravity cannot be relied on for operating the dog, and this is preferably accomplished by providing the ring P with a projection w' at the outer side of the tail j' for engaging and inwardly moving the tail j' to force the dog toward the locking position as soon as the tail j' has cleared the projection o', to mechanically lock the dog as soon as it becomes unrestrained, the tail j' being located to clear the path of the projection w' and the projection o' when the tail j' is unrestrained and moved to its locked position, so that the key and the manual operator P may revolve freely relatively to the tail j' when the coupling is uncoupled.

My improved principle of oscillatorily mounting the key in the inner periphery of a female driver and extending the key operator from the driving member past the axis of the key and into operative relation with it at the inner side of such axis, gains the advantage that the semi-cylindrical portion of the key may be mounted in the driver and oscillated reversely to the direction of drive for effecting its unlocking action in the desired direction, and permitting clearance for oscillation of the operating pin in the other direction, and for unlocking the key by rotation of the driving member in the direction of drive, as this arrangement affords in effect a reverse motion between the rotation provision of the driving member and the semi-cylindrical side of the key, which makes possible the relative action of these parts for drivingly unlocking a female periphery of a driver member from a male periphery of a driven shaft while affording lost motion between them. To vary this lost motion adjustability is preferably provided between the operator L and the projection r, preferably as shown by adjustably screwing the latter into the key K so that it may be projected more or less into the path of the operator L.

What I claim is:

1. In rotation transmissions, a rotary driver member, for receiving and transmitting rotation, and a rotary driven member rotative with and relatively to said member, for receiving and transmitting rotation therefrom, and for permitting relative rotation of said members, said members having adjacent reciprocal transmission faces having semi-cylindrical reciprocal keyway provisions in their adjacent portions, for permitting rotative connection of said members, the combination therewith of a radially yieldable semi-cylindrical oscillatory key oscillatorily mounted in one of said keyways and movable therein into and out of engagement with the other of said keyways, for drivingly disengaging said members when in one position and for circumferentially yieldingly drivingly engaging said members when in another position, for yieldingly transmitting such rotation, and means for moving said key.

2. In rotation transmissions, a driver member for receiving and transmitting rotation, and a driven member, rotatable with and relatively to said driver member, for receiving rotation therefrom, said members having adjacent reciprocal transmission faces having reciprocal keyways in their adjacent portions; the combination therewith of a trough shaped key within said keyways, for drivingly connecting said driver member and said driven member, having spaced relatively yieldable sides engaged with the sides of said keyways, and having an open-sided hollow portion between said sides, for yieldably torsionally drivingly connecting said driver member and said driven member.

3. In rotation transmissions, a driver member, for receiving and transmitting rotation, having a cylindrical bore and a semi-cylindrical internal keyway, a driven member for receiving rotation from said member, having a cylindrical periphery fitting within said bore and rotative with and relatively to said driver member and having a peripheral semi-cylindrical keyway reciprocal to said internal keyway, an oscillatory key for connecting said members having a semi-cylindrical portion fitted oscillatorily within and carried by said keyway in said driver member, and having a concave portion fitting against and corresponding with the periphery of said driven member, and oscillatory into and out of driving engagement with the keyway in said driven member, and having an oscillation provision for oscillating said key, and a rotatable and movable key operator, rotatable with and movable relatively to said key, and in operative relation to said provision and movable relatively to said provision during rotation of said operator for oscillating said key during such rotation.

4. In rotary transmissions, a rotary driving member, a rotary driver member adapted to have circumferential movement with respect to said driving member, a yieldable connection between said members designed to transmit a normal torque load, oscillatory clutch means in operative relation to and cooperable with said driver member, for transmitting rotation from said driver member, and clutch operator means rotatable by said driving member and inwardly of said clutch means and movable relatively to said driver member upon overload of said yieldable connection, for oscillating said clutch means for controlling such transmission.

5. In rotary transmissions, comprising a rotary driving member, a rotary driver member adapted to have circumferential movement with respect to said driving member, a yieldable connection between said members designed to transmit a normal torque load, oscillatory cylindrical clutch means in operative relation to and cooperable with said driver member, for transmitting rotation from one of said members, and clutch operator means rotated by said driving member and movable relatively to said driver member upon overload of said yieldable connection, the combination therewith of clutch oscillator means carried by said cylindrical clutch means for oscillating the latter, and across the path of such movement of said operator means, in operative relation to said operator means and moved by the latter upon overload of said yieldable connection, for oscillating said cylindrical clutch means upon such overload, for controlling such transmission.

6. In rotary transmissions, comprising a rotary driving member, a rotary driver member adapted to have circumferential movement with respect to said driving member, a yieldable connection between said members designed to transmit a normal torque load, oscillatory semi-cylindrical clutch means in operative relation to and cooperable with said driver member, for transmitting rotation from one of said members, and clutch operator means rotatable with said driving member, and movable relatively of said driver member upon overload of said yieldable connection; the combination therewith of clutch oscillator means cooperable with said clutch means for oscillating said clutch means, and in operative relation to said operator means and moved by the latter with said movement of said operator means upon overload of said yieldable connection, for oscillating said semi-cylindrical clutch means upon such overload, for controlling such transmission.

7. In rotation transmissions, comprising a rotary driving member rotatable about an axis, a rotary driver member rotatable about said axis with and adapted to have circumferential movement with respect to said driving member, a circumferentially yieldable connection between said members designed to transmit a normal torque load, clutch means in operative relation to and cooperable with said driver member for transmitting rotation from one of said members, and clutch operator means rotated by said driving member and in operative relation to said clutch means and movable relatively to said driver member upon overload of said yieldable connection, for operating said clutch means upon such overload, the combination therewith of laterally yieldable connection means between said driving member and said driver member, yieldable transversely of said circumferential movement, for transversely yieldably connecting said circumferentially movably connected members during such control of such transmission.

8. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, two of said members having reciprocal transmission faces having therein reciprocal keyways, clutch means oscillatory about an axis in one of said keyways, for terminating said transmission, having a transmission portion therein and having another portion coincident with said faces during said termination, and oscillatory across said faces and into the other of said keyways for effecting said transmission, and clutch operator means rotatable with said driving member during said transmission, said clutch means and said operator means the one movable relatively to the other upon overload of said yieldable connection, for operating said clutch means upon said overload, said clutch means having between said axis and said operator means a torque actuated clutch oscillator provision in the path of rotation of said operator means and in operative relation to the latter, rotatable with said driver member during said transmission, said oscillator provision and said operator means the one movable relatively to the other during said normal torque load, and said oscillator provision operated by said operator means upon overload of said yieldable connection, for terminating said transmission upon said overload.

9. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, two of said members having reciprocal transmission faces having therein reciprocal keyways, clutch means oscillatory about an axis in one of said keyways, for terminating said transmission, having a transmission portion therein and having another portion coincident with said faces during termination of said transmission, and oscillatory across said faces and into the other of said keyways for effecting said transmission, and clutch operator means rotatable with said driving member during said transmission, said clutch means and said operator means the one movable relatively to the other upon overload of said yieldable connection, for operating said clutch means upon said overload, said clutch means having at one side of said axis a torque actuated clutch oscillator provision in the path of rotation of said operator means and in operative relation to the latter, rotatable with said driver member during said transmission, said oscillator provision and said operator means the one movable relatively to the other during said normal torque load, and said operator means rotatable into operative relation with said oscillator provision at said side upon overload of said yieldable connection, for terminating said transmission upon said overload.

10. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, two of said members having reciprocal transmission faces having therein reciprocal keyways, clutch means oscillatory about an axis in one of said keyways for terminating said transmission, having a transmission portion therein and having another portion coincident with said faces during said termination, and oscillatory across said faces into the other of said keyways, for effecting said transmission, and clutch operator means rotatable with said driving member during said transmission, said clutch means and said operator means the one movable relatively to the other upon overload of said yieldable connection, for operating said clutch means upon said overload, said clutch means having a torque actuated clutch oscillator provision in the path of rotation of said operator means and in operative relation to the latter, rotatable with said driver member during said transmission, said oscillator provision and said operator means in approachable relation and the one approachably movable relatively to the other during said normal torque load, and said oscillator provision operated by said operator means during rotation of the latter toward said clutch means upon overload of said yieldable connection, for controlling said transmission upon said overload.

11. In rotation transmissions, a rotary driving member, for transmitting rotation, a driver member rotatable therewith, during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, two of said members having reciprocal transmission faces having therein reciprocal keyways, clutch means oscillatory about an axis in one of said keyways for terminating said transmission, having a transmission portion therein and having another portion coincident with said faces during said termination, and oscillatory across said faces into the other of said keyways for effecting said transmission, and clutch operator means rotatable with said driving member during said transmission, said clutch means and said operator means the one movable relatively to the other upon overload of said yieldable connection, for operating said clutch means upon said overload, said clutch means having a torque actuated clutch oscillator provision in the path of rotation of said operator means and in operative relation to the latter, rotatable with said driver member during said transmission, said oscillator provision and said operator means the one movable relatively to the other during said normal torque load, and said oscillator provision moved out of said path by said operator means upon overload of said yieldable connection, for terminating said transmission upon said overload, and thereupon passively positioned out of said path, for permitting rotation of said operator means.

12. In rotation transmissions, comprising, a rotary driving member, for transmitting rotation, a driver member rotatable therewith during said transmission, for transmitting rotation therefrom, one of said members movable relatively to the other, a yieldable connection in operative relation to said members designed to transmit a normal torque load, movable clutch means in operative relation to and co-operable with said driver member, for controlling said transmission, and clutch operator means rotatable with said driving member during said transmission, said clutch means and said operator means in operative relation and the one movable relatively to the other upon overload of said yieldable connection, for operating said clutch means upon said overload; the combination therewith of a torque actuated clutch mover provision, in operative relation to said clutch means for moving the latter, rotatable with said driver member during said transmission, and in operative relation to said operator means, said mover provision and said operator means the one movable relatively to the other during said normal torque load, and said mover provision movable in the direction of rotation of said operator means and moved in said direction thereby upon overload of said yieldable connection, for controlling said transmission upon said overload.

13. In rotation transmissions, comprising, a rotary driving member, for transmitting rotation, a driver member rotatable therewith during said transmission, for transmitting rotation therefrom, one of said members movable relatively to the other, a yieldable connection in operative relation to said members designed to transmit a normal torque load, movable clutch means in operative relation to and co-operable with said driver member, for controlling said transmission, and clutch operator means rotatable with said driving member during said transmission, said clutch means and said operator means in operative relation, and the one movable relatively to the other upon overload of said yieldable connection, for operating said clutch means upon said overload; the combination therewith of a swingable torque actuated mover provision, in operative relation to said clutch means for moving the latter, rotatable with said driver member during said transmission, and in swingable operative relation to said operator means, said mover provision and said operator means the one movable relatively to the other during said normal torque load, and said mover provision swingable in the direction of rotation of said operator means and swung in said direction by the latter upon overload of said yieldable connection, for controlling said transmission upon said overload.

14. In rotation transmissions, comprising, a rotary driving member, for transmitting rotation, a driver member rotatable therewith during said transmission, for transmitting rotation therefrom, one of said members movable relatively to the other, a yieldable connection in operative relation to said members designed to transmit a normal torque load, movable clutch means in operative relation to and co-operable with said driver member, for transmitting said rotation, and reversely movable for terminating said transmission, and clutch operator means rotatable with said driving member during said transmission, said clutch means and said operator means in operative relation, and the one movable relatively to the other upon overload of said yieldable connection, for operating said clutch means upon said overload; the combination therewith of motion reversal torque actuated clutch mover means, in motion reversal operative relation to said clutch means for moving the latter, rotatable with said driver member during said transmission, and in operative relation to said operator means, said motion reversal means and said operator means the one movable relatively to the other during said normal torque load, for permitting said transmission during said normal torque load, and said motion reversal provision moved in one direction by said operator means and operable to move said clutch means in a reverse direction upon overload of said yieldable connection, for controlling said transmission upon said overload.

15. In rotation transmissions, a rotary driving member, for transmitting rotation, a driver member rotatable therewith during said transmission, for transmitting rotation therefrom; a driven member rotatable with said driver member during said transmission, for transmitting rotation therefrom, and drivingly disengageable therefrom for terminating said transmission, one of said members movable relatively to another during said transmission, a yieldable drive connection in operative relation to two of said members designed to transmit a normal torque load, torsionally moved clutch means in operative relation to said yieldable connection and cooperable with said driver member, for transmitting said rotation during said normal torque load, and movable upon overload of said yieldable connection, for controlling said transmission upon said overload, and torsionally movable manually operable clutch controller means in operative relation to said clutch means and to said yieldable connection, inoperatively moved with said clutch means during torsional movement thereof, for permitting torsional control of said transmission, and manually movable relatively to said yieldable connection, for manually moving said clutch means, for manually controlling said transmission.

16. In rotation transmissions, comprising, a rotary driving member, for transmitting rotation, a driver member rotatable therewith during said transmission, for transmitting rotation therefrom, a driven member rotatable with said driver member during said transmission, for transmitting rotation therefrom, and rotatable relatively thereto upon termination of said transmission, one of said members movable relatively to another during said transmission, a yieldable drive connection in operative relation to two of said members designed to transmit a normal torque load, and torque operated controller means for controlling said transmission, in operative relation to and co-operable with said driver member, for transmitting said rotation during normal torque load, and in operative relation to said yieldable connection and operated thereby for terminating said transmission upon overload of said yieldable connection; the combination therewith of torque controlled brake means in operative relation to said driven member for resisting said relative rotation, and in operative relation to said yieldable connection and controlled thereby during said normal torque load, to permit rotation of said driven member with said driver member during said normal torque load, and operable upon overload of said yieldable connection to resist said relative rotation upon said overload, for torque controlled resistance of said relative rotation.

17. In rotation transmissions, comprising, a rotary driving member, for transmitting rotation, a driver member rotatable therewith during said transmission, for transmitting rotation therefrom, a driven member rotatable with said driver member during said transmission, for transmitting rotation therefrom, and rotatable relatively thereto upon termination of said transmission, one of said members movable relatively to another during said transmission, a yieldable drive connection in operative relation to two of said members designed to transmit a normal torque load, and torque operated controller means for controlling said transmission, in operative relation to and co-operable with said driver member, for transmitting said rotation during normal torque load, and in operative relation to said yieldable connection and operated thereby for terminating said transmission upon overload of said yieldable connection; the combination therewith of torque restrained brake means in operative relation to said driven member for resisting said relative rotation, and in operative relation to said yieldable connection and restrained thereby during said normal torque load, to permit rotation of said driven with said driver member during said normal torque load, and released thereby upon overload of said yieldable connection, and operable upon said overload to resist said relative rotation, for torque controlled resistance thereof.

18. In rotation transmissions, comprising, a rotary driving member, for transmitting rotation, a driver member rotatable therewith during said transmission, for transmitting rotation therefrom, a driven member rotatable with said driver member for transmitting rotation therefrom, and rotatable relatively thereto upon termination of said transmission, one of said members movable relatively to another, a yieldable drive connection in operative relation to two of said members designed to transmit a normal torque load, and torque operated controller means for controlling said transmission, in operative relation to and co-operable with said driver member, for transmitting said rotation during normal torque load, and in operative relation to said yieldable connection and operated thereby for terminating said transmission upon overload of said yieldable connection; the combination therewith of torque operated brake means in operative relation to said driven member for permitting rotation thereof with said driver member during normal torque load and for resisting said relative rotation thereof upon overload of said yieldable connection, and in operative relation to said yieldable connection and operated thereby upon overload thereof to resist said relative rotation upon said overload, for torque operated resistance of said relative rotation.

19. In rotation transmissions, comprising, a rotary driving member, for transmitting rotation, a driver member rotatable therewith during said transmission, for transmitting rotation therefrom, a driven member rotatable with said driver member for transmitting rotation therefrom, and rotatable relatively thereto upon termination of said transmission, one of said members movable relatively to another, a yieldable drive connection in operative relation to two of said members designed to transmit a normal torque load, and torque operated controller means for controlling said transmission, in operative relation to and co-operable with said driver member, for transmitting said rotation during normal torque load, and in operative relation to said yieldable connection and operated thereby for terminating said transmission upon overload of said yieldable connection; the combination therewith of lost motion torque responsive brake means in operative relation to said driven member for permitting rotation thereof with said driver member during said transmission, and in operative relation to said driven member for resisting said relative rotation thereof upon termination of said transmission, in lost motion operative relation to said yieldable connection during said normal torque load, and operable upon overload of said yieldable connection to resist said relative rotation upon said overload, for lost motion torque responsive resistance of said relative rotation.

20. In rotation transmissions, comprising, a rotary driving member, for transmitting rotation, a driver member rotatable therewith during said transmission, for transmitting rotation therefrom, a driven member rotatable with said driver member for transmitting rotation therefrom, and rotatable relatively thereto upon termination of said transmission, one of said members movable relatively to another, a yieldable drive connection in operative relation to two of said members designed to transmit a normal torque load, and torque operated controller means for controlling said transmission, in operative relation to and co-operable with said driver member, for transmitting said rotation during normal torque load, and in operative relation to said yieldable connection and operated thereby for terminating said transmission upon overload of said yieldable connection; the combination therewith of movable torque responsive brake means in operative relation to said driven member for permitting rotation thereof with said driver member during normal torque load and for resisting said relative rotation thereof upon overload of said yieldable connection, in movable operative relation to said yieldable connection and movable relatively thereto for permitting rotation of said driven member with said driver member during said normal torque load, and operable upon overload of said yieldable connection to resist said relative rotation upon said overload, for movable torque responsive resistance of said relative rotation.

21. In rotation transmissions, comprising, a rotary driving member, for transmitting rotation, a driver member rotatable therewith during said transmission, for transmitting rotation therefrom, a driven member rotatable with said driver member for transmitting rotation therefrom, and rotatable reversely thereto upon termination of said transmission, one of said members movable relatively to another, a yieldable drive connection in operative relation to two of said members designed to transmit a normal torque load, and torque operated controller means for controlling said transmission, in operative relation to and co-operable with said driver member, for transmitting said rotation during normal torque load, and in operative relation to said yieldable connection and operated thereby for terminating said transmission upon overload of said yieldable connection; the combination therewith of torque controlled back-lock means in operative relation to said driven member for permitting rotation thereof with said driver member during said transmission and for resisting reverse rotation of said driven member upon termination of said transmission, in operative relation to said yieldable connection and controlled thereby for permitting rotation of said driven member with said driver member during said normal load, and operable upon overload of said yieldable connection to resist said reverse rotation, for torque controlled resistance thereof.

22. In rotation transmissions, comprising, a rotary driving member, for transmitting rotation, a driver member rotatable therewith during said transmission, for transmitting rotation therefrom, a driven member rotatable with said driver member for transmitting rotation therefrom, and rotatable reversely thereto upon termination of said transmission, one of said members movable relatively to another, a yieldable drive connection in operative relation to two of said members designed to transmit a normal torque load, and torque operated controller means for controlling said transmission, in operative relation to and co-operable with said driver member, for transmitting said rotation during normal torque load, and in operative relation to said yieldable connection and operated thereby for terminating said transmission upon overload of said yieldable connection; the combination of torque restrained back-lock means in operative relation to said driven member for permitting rotation thereof with said driver member during said transmission, and for resisting reverse rotation thereof upon termination of said transmission, and in operative relation to said yieldable connection and restrained thereby during said normal torque load to permit rotation of said driven member with said driver member during said normal torque load, and released upon overload of said yieldable connection to then resist said reverse rotation, for torque restrained control thereof.

23. In rotation transmissions, comprising, a rotary driving member, for transmitting rotation, a driver member rotatable therewith during said transmission, for transmitting rotation therefrom, a driven member rotatable with said driver member for transmitting rotation therefrom, and rotatable reversely thereto upon termination of said transmission, one of said members movable relatively to another, a yieldable drive connection in operative relation to two of said members designed to transmit a normal torque load, and torque operated controller means for controlling said transmission, in operative relation to and co-operable with said driver member, for transmitting said rotation during normal torque load, and in operative relation to said yieldable connection and operated thereby for terminating said transmission upon overload of said yieldable connection; the combination therewith of torque operated back-lock means in operative relation to said driven member for permitting rotation thereof with said driver member during said transmission and for resisting reverse rotation thereof upon termination of said transmission, and in operative relation to said yieldable connection and operated thereby during said normal torque load to permit rotation of said driven member with said driving member, and operated upon overload of said yieldable connection to resist said reverse rotation, for torque operated resistance thereof.

24. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, clutch means in operative relation to and co-operable with said driver member, for controlling said transmission, and circumferentially active clutch operator means rotatable with said driving member during said transmission, circumferentially movable relatively to said clutch means, disposed a variable circumferentially spaced distance therefrom, and in circumferentially active operative relation thereto, for operating the latter, said clutch means and said operator means the one inoperatively movable a material distance circumferentially relatively to the other during said normal torque load, and inoperable during said circumferential movement throughout said distance to affect said transmission during said normal torque load, and the one operatively movable circumferentially in excess of said distance and into circumferentially active operative relation to the other upon overload of said yieldable connection, and circumferentially operable during said latter movement to operate said clutch means and control said transmission upon said overload, and the one having circumferential space adjustment means in operative relation to the other and operative to circumferentially vary said space, whereby to vary said control.

25. In rotation transmissions, a rotary driving member, for transmitting rotation, a driver member rotatable therewith during said transmission, for transmitting rotation therefrom, one of said members movable relatively to the other, a yieldable drive connection in operative relation to said members designed to transmit a normal torque load, movable clutch means in operative relation to and cooperable with said driver member, for controlling said transmission, and circumferentially active clutch operator means, rotatable with said driving member during said transmission, inwardly of said clutch means and in circumferentially active operative relation thereto inwardly thereof, for moving the latter, said clutch means and said operator means the one circumferentially movable relatively to the other into circumferentially active operative relation thereto upon overload of said yieldable connection, and said operator means operable during said circumferential movement to move said clutch means from inwardly thereof upon said overload, for controlling said transmission.

26. In rotation transmissions, a rotary driving member, for transmitting rotation, a driver member rotatable therewith during said transmission, for transmitting rotation therefrom, one of said members movable relatively to the other, a yieldable drive connection in operative relation to said members designed to transmit a normal torque load, movable clutch means in operative relation to and co-operable with said driver member, for controlling said transmission, and tangentially active clutch operator means rotatable with said driving member during said transmission, inwardly of said clutch means and in tangential operative relation thereto inwardly thereof, for moving the latter, said clutch means and said operator means the one inoperatively tangentially movable relatively to the other during said normal torque load, for permitting said transmission during said normal torque load, and movable into tangential operative relation with the other upon overload of said yieldable connection, and tangentially operable during said latter movement to move said clutch means from inwardly thereof upon said overload, for controlling said transmission.

27. In rotation transmissions, a rotary driving member, for transmitting rotation, a driver member rotatable therewith during said transmission, for transmitting rotation therefrom, one of said members movable relatively to the other, a yieldable drive connection in operative relation to said members designed to transmit a normal torque load, movable clutch means in operative relation to and cooperable with said driver member, for controlling said transmission, and clutch operator means rotatable with said driver member during said transmission, inwardly of said clutch means and in operative relation thereto inwardly thereof, for moving the latter, said clutch means and said operator means the one circumferentially movable relatively to the other, and in circumferentially approachable lost motion inoperative relation to the other during said normal torque load, and operable throughout said circumferential lost motion movement to permit said transmission during said normal torque load, and the one circumferentially approachably operatively movable relatively to the other and inwardly thereof upon overload of said yieldable connection, and operable during said operative movement to move said clutch means from inwardly thereof upon said overload, for controlling said transmission.

28. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another, a yieldable drive connection in operative relation to two of said members designed to transmit a normal torque load, movable clutch means in operative relation to and co-operable with said driver member, for controlling said transmission, in operative relation to and movable by said yieldable connection during said normal torque load, and operable upon overload of said yieldable connection to terminate said transmission, for torque control thereof upon said overload, and circumferentially torsionally movable manual operator means in circumferentially movable operative relation to said clutch means and circumferentially moved thereby during said torsional movement thereof, for permitting torsional control of said transmission, and circumferentially manually operable, for manually controlling said transmission.

29. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, two of said members having reciprocal transmission faces having therein reciprocal keyways, clutch means oscillatory about an axis in one of said keyways for terminating said transmission, having a transmission portion therein, and having another portion coincident with said faces during said termination, and oscillatory across said faces and into the other of said keyways for effecting said transmission, and clutch operator means rotatable with said driving member during said transmission, said clutch means and said operator means the one movable relatively to the other upon overload of said yieldable connection, for operating said clutch means and terminating said transmission upon said overload, said clutch means having between said axis and said operator means a torque actuated clutch oscillator provision in the path of rotation of said operator means and in operative relation to the latter, rotatable with said driver member during said transmission, said oscillator provision and said operator means the one movable with the other in said path during yield of said connection during said normal torque load, for permitting said transmission during said yield, and said oscillator provision operated by said operator means upon overload of said yieldable connection, for terminating said transmission upon said overload.

30. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, two of said members having reciprocal transmission faces having therein reciprocal keyways, clutch means oscillatory about an axis in one of said keyways, for terminating said transmission, having a transmission portion therein and having another portion coincident with said faces during said termination, and oscillatory across said faces and into the other of said keyways for effecting said transmission, and clutch operator means rotatable with said driving member during said transmission, said clutch means and said operator means the one movable relatively to the other upon overload of said yieldable connection, for operating said clutch means and terminating said transmission upon said overload, said clutch means having a torque actuated clutch oscillator provision in operative relation to said operator means, and rotatable with said driver member during said transmission, said oscillator provision and said operator means the one moved in the direction of said rotation by the movement of the other in said direction upon overload of said yieldable connection, and said oscillator provision and said operator means co-operably operative during said movement in said direction to move said transmission portion of said clutch means reversely to said direction and reversely to the direction of torque actuation of said oscillator provision, for torque termination of said transmission upon said overload by oscillation of said transmission portion reversely to the direction of and by said torque.

31. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, transmission-termination clutch means in operative relation to and co-operable with said driver member, for terminating said transmission, and clutch operator means rotatable with said driving member during said transmission, said clutch means and said operator means in operative relation and the one movable relatively to the other upon overload of said yieldable connection, for operating said clutch means and terminating said transmission upon said overload; the combination therewith of a torque actuated mover provision in operative relation to said clutch means for operating the latter, rotatable with said driver member during said transmission, and in operative relation to said operator means, said mover provision and said operator means the one moved by the other upon overload of said yieldable connection, and said mover provision disposed across the path of rotation of said operator means and moved by the latter into transmission termination position upon overload of said yieldable connection, for terminating said transmission upon said overload.

32. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, torque operated transmission-termination clutch means, in operative relation to and co-operable with said driver member, for terminating said transmission, and clutch operator means rotatable with said driving member during said transmission, said clutch means and said operator means in operative relation and the one movable relatively to the other upon overload of said yieldable connection, for operating said clutch means for terminating said transmission upon said overload; the combination therewith of a torque actuated mover provision in operative relation to said clutch means for moving the latter, rotatable with said driver member during said transmission and in operative relation to said operator means, said mover provision and said operator means the one movable relatively to the other during yield of said connection during said normal torque load, for permitting said transmission during said yield, and said mover provision disposed in the path of transmission of said operator means and moved by the latter into rotation termination position, upon overload of said yieldable connection, for terminating said transmission upon said overload.

33. In rotation transmissions, a rotary driving member, for transmitting rotation, a driver member rotatable therewith during said transmission, for transmitting rotation therefrom, a driven member rotatable with said driver member during said transmission, for transmitting rotation therefrom, one of said members movable relatively to another during said transmission, a yieldable drive connection in operative relation to two of said members designed to transmit a normal torque load, torque actuated transmission-termination clutch means in operative relation and co-operable with said driver member, for terminating said transmission, and circumferentially active clutch operator means rotatable with said driving member during said transmission, said clutch means and said operator means in operative relation and the one movable relatively to the other upon overload of said yieldable connection, for operating said clutch means and terminating said transmission upon said overload; the combination therewith of a torque actuated clutch mover provision, in operative relation to said clutch means for moving the latter, rotatable with said driver member during said transmission, and in operative relation to said operator means, said mover provision and said operator means in circumferentially spaced operative relation and the one inoperatively circumferentially movable relatively to the other during yield of said connection during normal torque load, for permitting said transmission during said yield, and said mover provision and said operator means the one circumferentially movable into operative relation with the other and moved thereby into transmission termination position upon overload of said yieldable connection, for terminating said transmission upon said overload.

GEORGE HOLT FRASER.